United States Patent
Liu et al.

(10) Patent No.: US 12,405,468 B2
(45) Date of Patent: Sep. 2, 2025

(54) VR EQUIPMENT

(71) Applicant: GUANGZHOU LUXVISIONS INNOVATION TECHNOLOGY LIMITED, Guangzhou (CN)

(72) Inventors: Yi-Wei Liu, Guangzhou (CN); Ying Liu, Guangzhou (CN); Tsung-Kai Chang, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 399 days.

(21) Appl. No.: 18/184,653

(22) Filed: Mar. 15, 2023

(65) Prior Publication Data
US 2024/0176145 A1    May 30, 2024

(30) Foreign Application Priority Data

Nov. 28, 2022  (CN) .......................... 202211500180.0

(51) Int. Cl.
*G02B 27/01* (2006.01)
*G02B 13/00* (2006.01)
*G02B 27/00* (2006.01)

(52) U.S. Cl.
CPC ....... *G02B 27/0172* (2013.01); *G02B 13/004* (2013.01); *G02B 27/0093* (2013.01)

(58) Field of Classification Search
CPC .............. G02B 27/0172; G02B 13/004; G02B 27/0093
See application file for complete search history.

(56) References Cited

U.S. PATENT DOCUMENTS

2019/0129181 A1* 5/2019 Polcak ............... G02B 27/0093

* cited by examiner

*Primary Examiner* — Wen Huang
(74) *Attorney, Agent, or Firm* — JCIPRNET

(57) ABSTRACT

A VR equipment includes a casing, and an optical module, an eye movement module, and a display module located inside the casing. The optical module includes a lens barrel and first to fourth lenses located in the lens barrel and arranged in sequence from an object plane to an image plane along an optical axis. The eye movement module is located between the first and second lenses. The eye movement module has a light-emitting unit and a receiving unit. The light-emitting unit emits a detection light to human eyes which is then reflected. The reflected detection light is reflected at an object side surface of the second lens and then enters the receiving unit after passing through an object side surface and an image side surface of the first lens. The display module is at an image side surface of the fourth lens. The display module displays an image.

10 Claims, 9 Drawing Sheets

VR EQUIPMENT

CROSS-REFERENCE TO RELATED APPLICATION

This application claims the priority benefit of China application serial no. 202211500180.0, filed on Nov. 28, 2022. The entirety of the above-mentioned patent application is hereby incorporated by reference herein and made a part of this specification.

BACKGROUND OF THE INVENTION

Field of the Invention

The invention relates to the technical field of virtual display, in particular to a VR equipment.

Description of Related Art

With the development of science and technology, virtual reality (VR) equipment is adopted by a large number of users. Some games, movie viewing, and other fields adopt VR equipment to simulate real scenes and bring good experience effects.

In order to further enhance user experience, an eye tracking module is usually disposed in the VR equipment. Eye tracking means that when the human eyes moves, it may be tracked to understand the movement trajectory thereof, so that the computer equipment may understand where the operator is looking. The eye tracking module has better application prospects in the automatic focus techniques in VR equipment.

However, in existing VR equipment, the eye-tracking module is usually disposed outside the casing of the VR equipment, so that the overall structure is partially protruded. This makes the overall structure asymmetrical, thus affecting the accuracy of eye tracking, and increases the manufacturing cost and overall aesthetics of the product.

SUMMARY OF THE INVENTION

The invention provides a VR equipment ensuring aesthetics of the overall structure of the VR equipment, lowering manufacturing costs, and improving imaging quality at the same time to ensure user experience.

An embodiment of the invention provides a VR equipment, including: a casing, and an optical module, an eye movement module, and a display module located inside the casing.

The optical module includes a lens barrel and a first lens, a second lens, a third lens, and a fourth lens located in the lens barrel and arranged in sequence from an object plane to an image plane along an optical axis.

The eye movement module is located between the first lens and the second lens. The eye movement module is provided with a light-emitting unit and a receiving unit, and the light-emitting unit emits a detection light to human eyes and then the detection light is reflected. After the reflected detection light passes through an object side surface and an image side surface of the first lens, the reflected detection light is reflected at an object side surface of the second lens and then enters the receiving unit.

The display module is located at an image side surface of the fourth lens, and the display module is configured to display an image.

Optionally, the VR equipment further includes an adjustment unit. The adjustment unit is movably connected to the casing and connected to the lens barrel, and the adjustment unit is configured to drive the lens barrel to move to adjust a distance between the third lens and the fourth lens.

Optionally, a focal length of the second lens is FL2, and a focal length of the fourth lens is FL4, wherein $FL2>0$ and $FL4<0$.

Optionally, a radius of curvature of an object side surface of the second lens is R2, wherein $157.5 \leq R2 \leq 318.5$.

Optionally, a refractive index of the fourth lens is Nd and an Abbe number thereof is Vd, wherein $Nd>1.6$ and $Vd<30$.

Optionally, an object side surface of the second lens is provided with an infrared light reflection film and a visible light anti-reflection film, and an image side surface of the fourth lens is provided with a semi-transparent and semi-reflective film.

Optionally, the optical module further includes an optical polarization conversion film, and the optical polarization conversion film is disposed between the second lens and the third lens.

Optionally, a distance from a center of an optical axis of the object side surface of the first lens to the image plane is TTL, wherein $19 \text{ mm} \leq TTL \leq 32 \text{ mm}$.

Optionally, a focal length of the first lens is FL1, and an effective focal length of the optical module is EFL, wherein $43.5 \text{ mm} \leq FL1 \leq 81.2 \text{ mm}$, $0.37 < EFL/FL1 < 0.41$.

Optionally, a field of view of the optical module is FOV, wherein $FOV \geq 90°$.

The technical solution of an embodiment of the invention, through a VR equipment, includes: a casing, and an optical module, an eye movement module, and a display module located inside the casing. The optical module includes a lens barrel and a first lens, a second lens, a third lens, and a fourth lens located in the lens barrel and arranged in sequence from an object plane to an image plane along an optical axis. The eye movement module is located between the first lens and the second lens. The eye movement module is provided with a light-emitting unit and a receiving unit. The light-emitting unit emits a detection light to human eyes and then the detection light is reflected. After the reflected detection light passes through an object side surface and an image side surface of the first lens, the reflected detection light is reflected at an object side surface of the second lens and then enters the receiving unit. The display module is located at an image side surface of the fourth lens, and the display module is configured to display an image. The setting position of the eye movement module is changed to ensure the overall structural aesthetics of the VR equipment and reduce production cost. At the same time, the changes of the human eyes are collected via the eye movement module, and the parameter performance of each lens in the optical module is used in conjunction to improve imaging quality and ensure user experience.

It should be understood that the content described in this section is not intended to identify key or important features of the embodiments of the invention, nor is it intended to limit the scope of the invention. Other features of the invention are easily understood from the following description.

BRIEF DESCRIPTION OF THE DRAWINGS

In order to more clearly explain the technical solutions in the embodiments of the invention, the following briefly introduces the figures required in the description of the embodiments. Obviously, the figures in the following description are only some embodiments of the invention. For those of ordinary skill in the art, without inventive-step effort, other figures may be obtained based on these figures.

DESCRIPTION OF THE EMBODIMENTS

In order to enable those skilled in the art to better understand the solutions of the invention, the following will clearly and completely describe the technical solutions in the embodiments of the invention in conjunction with the drawings in the embodiments of the invention. Obviously, the described embodiments are only some, not all, embodiments of the invention. Based on the embodiments of the invention, all other embodiments obtained by those of ordinary skill in the art without making creative efforts shall fall within the scope of the invention.

It should be noted that the terms "first" and "second" in the description and claims of the invention and the above drawings are used to distinguish similar objects, but not necessarily used to describe a specific sequence or order of precedence. It is to be understood that the data so used are interchangeable under appropriate circumstances such that the embodiments of the invention described herein may be practiced in sequences other than those illustrated or described herein. Moreover, the terms "include" and "have", as well as any variations thereof, are intended to cover a non-exclusive inclusion, for example, a process, method, system, product, or equipment including a series of steps or units is not necessarily limited to those steps or units explicitly listed. Instead, other steps or units not explicitly listed or inherent to the process, method, product, or equipment may be included.

Figure 1:
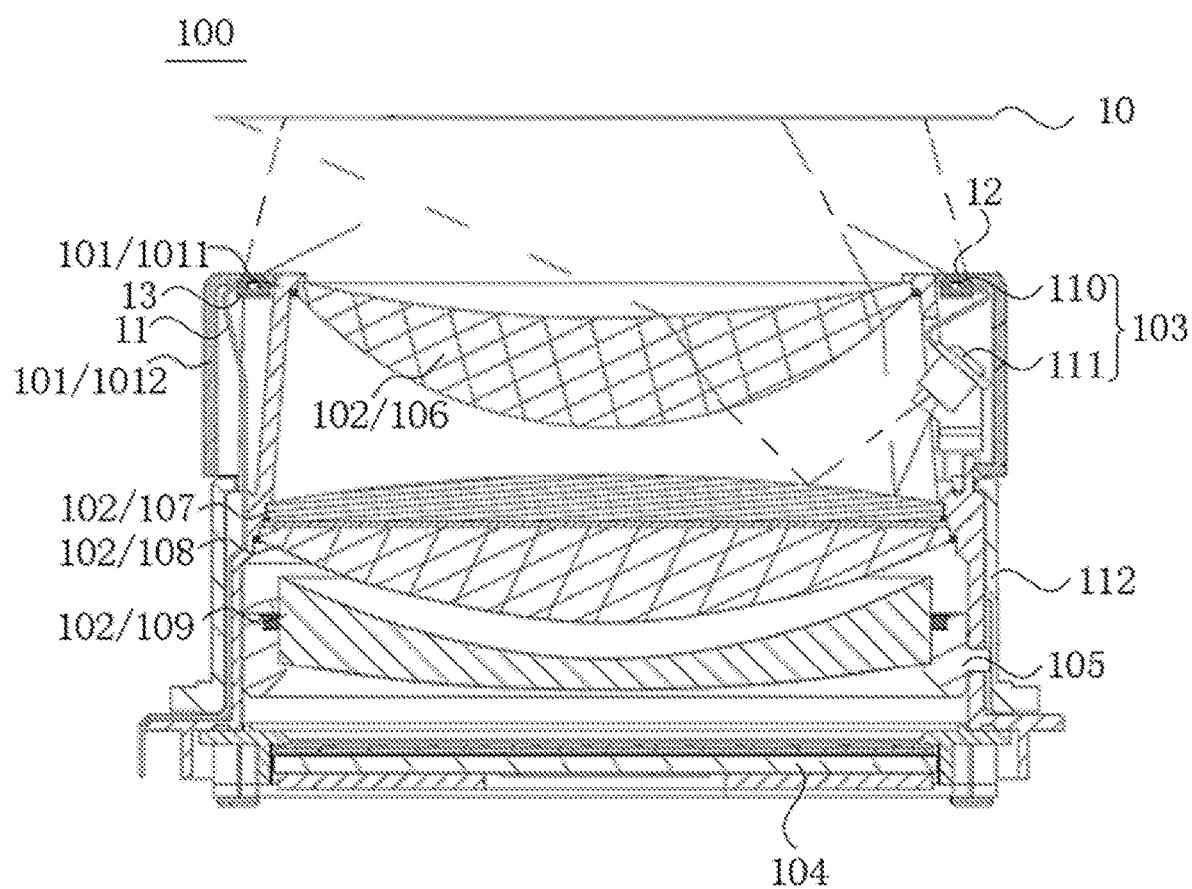
FIG. 1 is a schematic structural diagram of a VR equipment provided by an embodiment of the invention.
Figure 2:
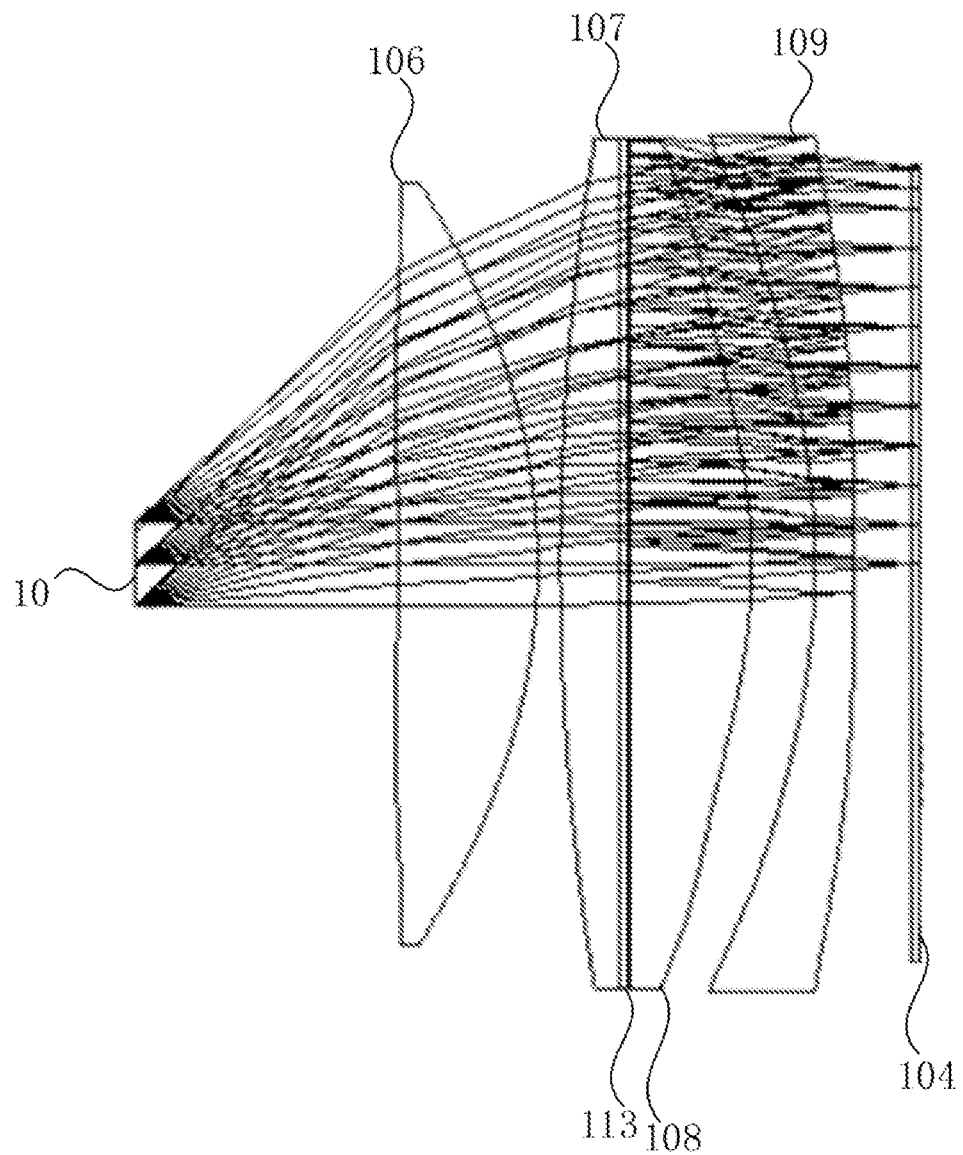
FIG. 2 is a schematic structural diagram of an optical path of a VR equipment provided by an embodiment of the invention.
Figure 3:
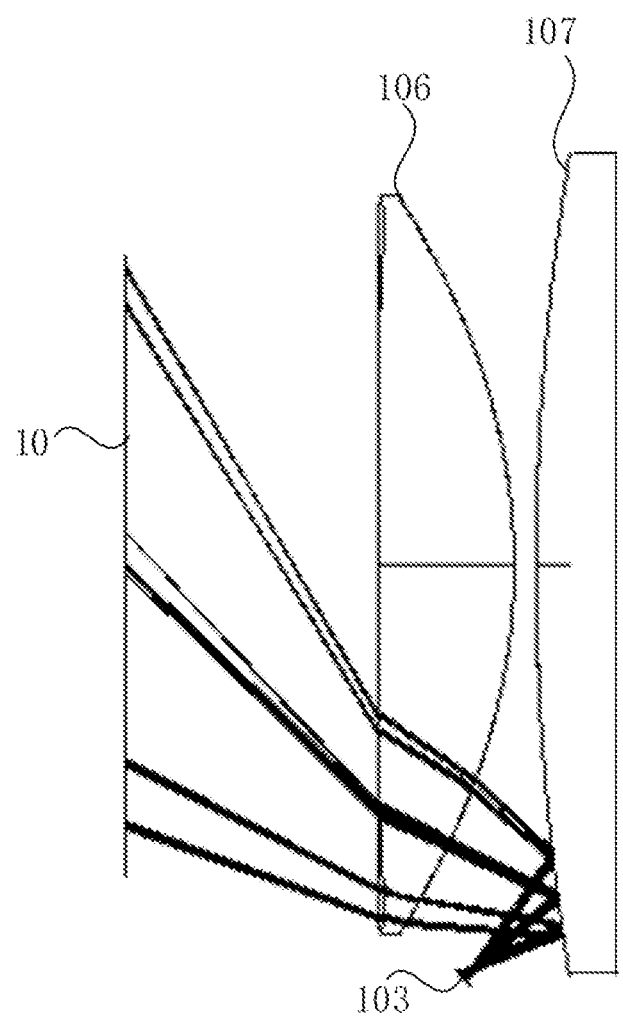
FIG. 3 is a schematic structural diagram of an optical path of an eye movement module provided by an embodiment of the invention.

FIG. 1 is a schematic structural diagram of a VR equipment provided by an embodiment of the invention, FIG. 2 is a schematic structural diagram of an optical path of a VR equipment provided by an embodiment of the invention, and FIG. 3 is a schematic structural diagram of an optical path of an eye movement module provided by an embodiment of the invention. As shown in FIG. 1, FIG. 2, and FIG. 3, a VR equipment 100 includes: a casing 101, and an optical module 102, an eye movement module 103, and a display module 104 located inside the casing 101. The optical module 102 includes a lens barrel 105 and a first lens 106, a second lens 107, a third lens 108, and a fourth lens 109 located in the lens barrel 105 and arranged in sequence from the object plane to the image plane along the optical axis. The eye movement module 103 is located between the first lens 106 and the second lens 107. The eye movement module 103 is provided with a light-emitting unit 110 and a receiving unit 111. The light-emitting unit 110 emits a detection light to human eyes 10 and then the detection light is reflected. After the reflected detection light passes through the object side surface and the image side surface of the first lens 106, the reflected detection light is reflected at the object side surface of the second lens 107 and then enters the receiving unit 111. The display module 104 is located at the image side surface of the fourth lens 109, and the display module 104 is configured to display an image.

In particular, the VR equipment 100 includes a casing 101, the casing 101 is configured to accommodate and protect the optical module 102, the eye movement module 103, and the display module 104, the casing 101 may include a first casing subsection 1011 fixing the optical module 102 and the display module 104 and a second casing subsection 1012 supporting and fixing the eye movement module 103. The object plane is the plane where the human eyes 10 are located, and the image plane is the plane where the display module 104 is located. The optical module 102 includes a lens barrel 105 and a first lens 106, a second lens 107, a third lens 108, and a fourth lens 109 located inside the lens barrel 105 and arranged in sequence from the object plane to the image plane along the optical axis, the surface of the lens adjacent to the object plane is the object side surface, and the surface of the lens adjacent to the image plane is the image side surface. Exemplarily, the image side surface of the first lens 106 is convex toward the side of the image plane. The second lens 107 may be a plano-convex lens, the object side surface thereof is flat, and the image side surface thereof is convex toward the side of the image plane. The image side surface of the third lens 108 is convex toward the side of the image plane. The image side surface of the fourth lens 109 is convex toward the side of the image plane, and the object side surface of the fourth lens 109 is convex toward the image plane, wherein the image side surface of the third lens 108 and the object side surface of the fourth lens 109 may be attached to each other to reduce the air gap between the third lens 108 and the fourth lens 109 to reduce chromatic aberration, and at the same time reduce the overall length of the optical module 102 to ensure good imaging effect. The first lens 106, the third lens 108, and the fourth lens 109 may all be plastic lenses, and the second lens 107 may be a plastic lens or a glass lens. An all-plastic optical module 102 may reduce the manufacturing cost and reduce the weight of the equipment, and the glass-plastic mixed optical module 102 may further improve the optical performance of the optical module 102. The specific material selection may be selected according to actual design requirements, and is not specifically limited in the present embodiment of the invention. The lens barrel 105 may be movably connected to the casing 101 to facilitate the movement of the optical module 102 and implement the adjustable focus operation of the VR equipment 100. Compared with the traditional eye tracking module disposed outside the casing 101 of the VR equipment 100, since the first lens 106 and the second lens 107 are arranged at intervals along the optical axis, in the invention, the eye movement module 103 is disposed between the first lens 106 and the second lens 107, and the eye movement module 103 is built in the casing 101 to ensure the overall aesthetics of the VR equipment 100. The eye movement module 103 is provided with the light-emitting unit 110 and the receiving unit 111. The light-emitting unit 110 may be an infrared light-emitting diode configured to emit infrared detection light to the human eyes 10. Two light-emitting units 110 may be provided, corresponding to the left and right eyes of the human eyes 10 respectively. The receiving unit 111 may be an infrared light sensor configured to receive the detection light reflected by the human eyes 10, and only one receiving unit 111 may be provided and fixed on any light-emitting unit 110. Exemplarily, two light-emitting units 110 are provided, one receiving unit 111 is provided, and the receiving unit 111 is disposed on the right light-emitting unit 110. The light output unit 110 emits the detection light to the human eyes 10 and then the detection light is reflected. After the reflected detection light passes through the object side surface and the image side surface of the first lens 106 in sequence, the reflected detection light enters the object side surface of the second lens 107. The detection light is incident on the receiving unit 111 after being reflected at the object side surface of the second lens 107, and the receiving unit 111 receives the detection light. Since the human eyes 10 are moving, the angle of the detection light received by the receiving unit 111 is different, and the tracking of the human eyes 10 thereby may be implemented accordingly. The display module 104 is located at the image side surface of the fourth lens 109, and the display module 104 is configured to display an image. When the user wears the VR equipment 100, the display image is projected to the human eyes 10 via the optical module 102 to ensure the viewing effect of the user. Since the eye movement module 103 and the optical module 102 are disposed in the casing 101 at the same time, since the object side surface of the second lens 107 reflects the infrared detection light used by the eye movement module 103, the infrared detection light does not exit to the third lens 108 through the second lens 107, and only visible light may pass through the second lens 107. Therefore, the eye movement module 103 may track the human eyes 10 and the user may watch the display screen normally without mutual interference, so as to ensure the normal operation of the VR equipment 100 and at the same time ensure user experience. In particular, the eye movement module 103 also includes a light panel located at the backlight side of the light output unit 110, a light-transmitting plate located at the light output side of the light output unit 110, and a reinforcing plate located on the light panel. The light panel is configured to supply power to the light output unit 110 to ensure the normal operation of the light output unit 110. The light panel may be in the shape of a thin plate. The light panel 411 may be a flexible circuit board, a printed circuit board made of polyimide or polyester film as a base material with good bendability, lighter weight, and less thickness to facilitate matching the shape of the space between the first lens 106 and the second lens 107. The specific shape thereof may be designed according to the shape of the space between the first lens 106 and the second lens 107, and the light panel 11 may be fixed on the casing 101 by a method such as bonding or bolting. The light-transmitting plate 12 is configured to filter the detection light emitted by the light-emitting unit 110, so that the infrared light of a fixed waveband may pass via the light-transmitting plate 12 and enter the human eyes 10. The reinforcing plate 13 may be configured to improve the strength of the light panel 11, and a plurality of reinforcing plates 13 may be provided to protect the light panel 11. The VR equipment 100 matches the pupil range of the corresponding human eyes 10 within 4 mm to 8 mm, ensuring that most users may use the VR equipment 100 normally.

In an embodiment of the invention, the first lens, the second lens, the third lens, and the fourth lens are disposed in the optical module to adjust the light, ensure imaging effect, and at the same time ensure the visual experience of the user. At the same time, the eye movement module is built between the casing and disposed between the first lens and the second lens to ensure accurate reception of the detection light reflected by the human eyes, ensure the overall structure aesthetics of the VR equipment, and lower manufacturing costs.

Optionally, referring further to FIG. 1, the VR equipment 100 also includes an adjustment unit 112, the adjustment unit 112 is movably connected to the casing 101 and connected to the lens barrel 105, and the adjustment unit 112 is configured to drive the lens barrel 105 to move to adjust the distance between the third lens 108 and the fourth lens 109.

In particular, the adjustment unit 112 may be a focusing element, and may adjust the optical module 102 according to the tracking result of the human eyes 10 output by the eye movement module 103. By affecting the focusing effect of the optical module 102, the viewing effect of the user wearing the VR equipment 100 is affected, so as to improve user experience. The adjustment unit 112 is mounted on the outer wall of the lens barrel 105, and the adjustment unit 112 is movably connected to the casing 101. At the same time, the fourth lens 109 is fixed in the lens barrel 105, so that the movement of the adjustment unit 112 may drive the movement of the fourth lens 109, thereby affecting the relative positional relationship between the fourth lens 109 and the third lens 108, so that the distance between the fourth lens 109 and the third lens 108 may be adjusted, thus affecting the diopter of the optical module 102. The adjustable range of diopter is 0D to −6D. The unit of refractive power is diopter. The stronger the refractive power, the shorter the focal length. The weaker the refractive power, the longer the focal length. The specific choice of diopter is adjusted according to the naked eye vision clarity requirements of different users. By implementing the distance between the third lens 108 and the fourth lens 109, the optical module 102 may effectively meet the requirements of naked eyesight conditions of different users and improve imaging effect.

Optionally, referring further to FIG. 1, FIG. 2, and FIG. 3, the focal length of the second lens 107 is FL2, and the focal length of the fourth lens 109 is FL4, wherein FL2>0 and FL4<0.

In particular, the second lens 107 has a positive focal length, and the fourth lens 109 has a negative focal length. Rationally using each lens and allocating the focal length of each lens facilitates the correction of aberrations and the reduction of the distortion of the optical module 102 to ensure the optical module 102 has a higher resolution, thereby ensuring imaging effect.

Optionally, referring further to FIG. 1, FIG. 2, and FIG. 3, the radius of curvature of the object side surface of the second lens 107 is R2, wherein 157.5≤R2≤318.5.

In particular, the unit of the radius of curvature is millimeter (mm), and the radius of curvature R2 of the object side surface of the second lens 107 is set to satisfy 157.5≤R2≤318.5. Controlling the degree of curvature of the object side surface of the second lens 107 is conducive to implementing the reflection of the detection light emitted by the light-emitting unit 110 of the eye movement module 103 at the object side surface of the second lens 107, and then the detection light is received by the receiving unit 111 of the eye movement module 103 to implement the tracking of the human eyes 10. At the same time, optimizing the shape of the second lens 107 facilitates the improvement of the imaging quality of the optical module 102 to ensure the overall optical performance of the VR equipment 100.

Optionally, the refractive index of the fourth lens 109 is Nd and the Abbe number thereof is Vd, wherein Nd>1.6 and Vd<30.

In particular, the refractive index is the ratio of the propagation speed of light in a vacuum to the propagation speed of light in a medium, and is mainly used to describe the refraction ability of materials for light. Different materials have different refractive indices. The Abbe number is an index used to represent the dispersion ability of a transparent medium. The more serious the dispersion of the medium, the less the Abbe number; conversely, the lighter the dispersion of the medium, the larger the Abbe number. In this way, by matching and setting the refractive index and the Abbe number of the fourth lens 109 in the optical module 102, the adjustment of the light incident on the fourth lens 109 is ensured, and the balance of the incident angle between adjacent lenses is ensured, thus reducing the sensitivity of the lens and improving the practicality of production, and at the same time ensuring the viewing angle of the optical module 102, thereby ensuring the optical performance of the VR equipment 100.

Optionally, referring further to FIG. 1, FIG. 2, and FIG. 3, the object side surface of the second lens 107 is provided with an infrared light reflection film and a visible light anti-reflection film, and the image side surface of the fourth lens 109 is provided with a semi-transparent and semi-reflective film.

In particular, in order to further ensure the tracking effect of the eye movement module 103 on the human eyes 10, an infrared light reflection film and a visible light anti-reflection film may be disposed at the object side surface of the second lens 107, so that the detection light emitted by the light-emitting unit 110 of the eye movement module 103 is incident on the object side surface of the second lens 107 after passing through the first lens 106, and is emitted through the infrared light reflection film disposed outside the object side surface, and then is incident on the receiving unit 111 of the eye movement module 103, thus ensuring that the detection light may be incident on the receiving unit 111 as much as possible to complete the tracking of the human eyes 10 by the eye movement module 103. This ensures accurate data for follow-up focusing, ensures the optical performance of the VR equipment 100, thereby improving user experience. At the same time, a visible light anti-reflection film is disposed outside the object side surface of the second lens 107 to ensure that visible light may normally pass through the second lens 107 and then enter the third lens 108 and the fourth lens 109. At the same time, the image side surface of the fourth lens 109 is provided with a semi-transparent and semi-reflective film to ensure that 50% of the light emitted by the fourth lens 109 may pass through the image side surface of the fourth lens 109, 50% is reflected by the image side surface of the fourth lens 109, and the film layer structure located on the lens is reasonably disposed according to design requirements to further improve the optical performance of the VR equipment 100.

Optionally, referring to FIG. 1, FIG. 2, and FIG. 3, the optical module 102 further includes an optical polarization conversion film 113, and the optical polarization conversion film 113 is disposed between the second lens 107 and the third lens 108.

In particular, an optical polarization conversion film 113 is disposed between the second lens 107 and the third lens 108, so that the light emitted from the image side surface of the second lens 107 changes the polarization state of the light through the optical polarization conversion film 113 and enters the object side surface of the third lens 108. After being reflected by the image side surface of the fourth lens 109 provided with a semi-transparent and semi-reflective film, the polarization state of the light is changed by the optical polarization conversion film 113 again and then incident on the image side surface of the second lens 107. The light emitted from the image side surface of the second lens 107 is incident on the object side surface of the third lens 108, and then emerges through the image side surface of the fourth lens 109. Through multiple reflections of the light between the second lens 107, the optical polarization conversion film 113, and the image side surface of the fourth lens 109, the divergence angle of the light is changed, thereby matching the viewing angle of the optical module 102, thereby ensuring the optical performance of the VR equipment 100.

Optionally, referring further to FIG. 1, FIG. 2, and FIG. 3, the distance from the center of the optical axis of the object side surface of the first lens 106 to the image plane is TTL, wherein 19 mm≤TTL≤32 mm.

Optionally, the focal length of the first lens 106 is FL1, and the effective focal length of the optical module 102 is EFL, wherein 43.5 mm≤FL1≤81.2 mm, 0.37<EFL/FL1<0.41.

In particular, the distance TTL from the center of the optical axis on the object side surface of the first lens 106 to the image plane may be understood as the total length of the optical module 102. The effective focal length EFL of the optical module 102 may be understood as the distance between the center of the optical module 102 and the focal point of the optical module 102. At the same time, the range of the effective focal length EFL of the optical module 102 is between 18 mm and 30 mm. By reasonably setting the total length of the optical module 102 and the relationship between the effective focal length of the optical module 102 and the focal length of the first lens 106, it may ensure that the entire optical module 102 has a compact structure, and the optical module 102 has a high degree of integration, and at the same time the optical performance of the VR equipment 100 is improved to ensure imaging effect and enhance user experience.

Optionally, referring further to FIG. 1, FIG. 2, and FIG. 3, the viewing angle of the optical module 102 is FOV, wherein FOV>90°.

In particular, the optical module 102 provided by an embodiment of the invention is an optical module 102 with a large field of view, which meets the requirement of a large field of view, thereby improving user experience.

Figure 4:
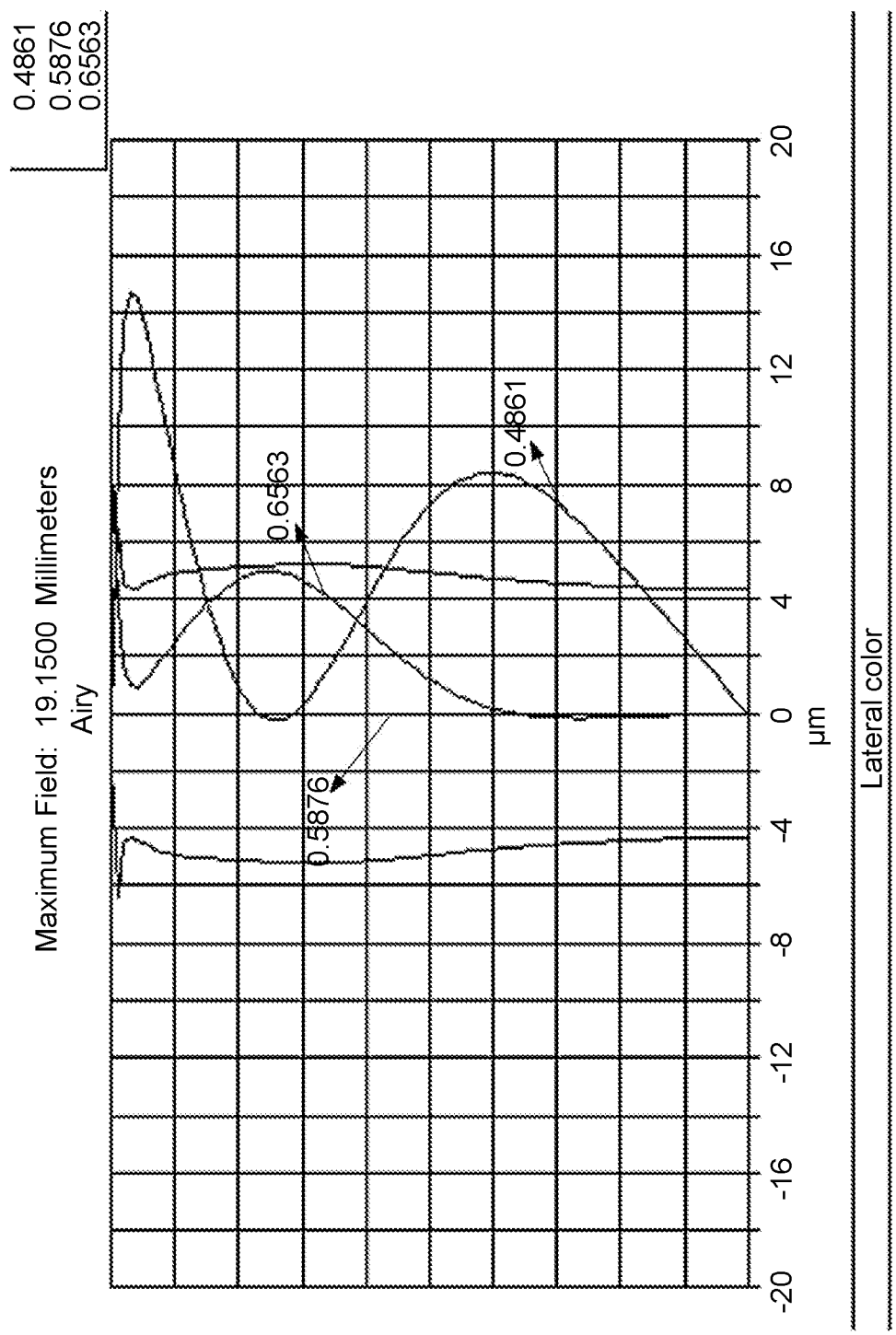
FIG. 4 is a vertical axis chromatic aberration diagram of a VR equipment provided by an embodiment of the invention.

FIG. 4 is a vertical axis chromatic aberration diagram of a VR equipment provided by an embodiment of the invention. As shown in FIG. 4, the vertical direction represents the normalization of the field of view angle, and 0 means on the optical axis, the apex in the vertical direction represents the maximum field of view radius; the horizontal direction is the offset amount of the meridian range based on 0.587 μm, and the unit is μm. The numbers on the curve in the figure indicate the wavelength represented by the curve, and the unit is μm. It may be seen from FIG. X that the vertical axis chromatic aberration may be controlled within the range of (−2 μm, 16 μm).

Figure 5:
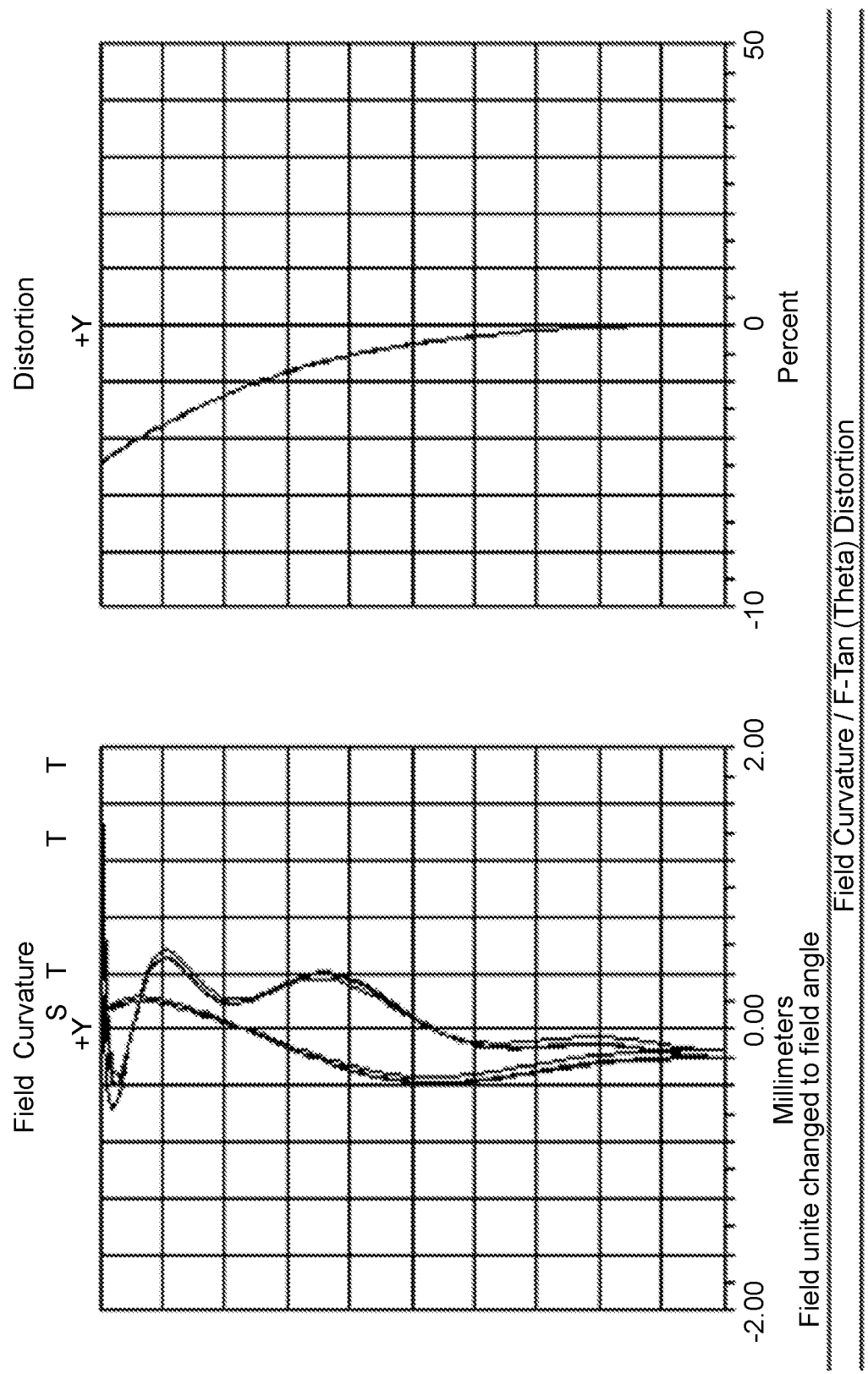
FIG. 5 is a field curvature distortion diagram of a VR equipment provided by an embodiment of the invention.

FIG. 5 is a field curvature distortion diagram of a VR equipment provided by an embodiment of the invention. As shown in FIG. 5, in the coordinate system on the left, the horizontal coordinate indicates the size of the field curvature, and the unit is mm; the vertical coordinate indicates the normalized image height, and there is no unit; wherein T indicates the meridian, and S indicates arc loss. As may be seen from FIG. 5, the VR equipment 100 provided in the present embodiment is effectively controlled in terms of field curvature from light with a wavelength of 486 nm to light with a wavelength of 656 nm. That is, when imaging, the difference between the image quality at the center and the image quality at the periphery is less. In the coordinate system on the right, the horizontal coordinate indicates the size of the distortion, and the unit is %; the vertical coordinate indicates the normalized image height, and there is no unit; it may be seen from FIG. 5 that the distortion of the VR equipment 100 provided by an embodiment of the invention is better corrected, and the imaging distortion is less, thus meeting the requirement of low distortion.

Figure 6:
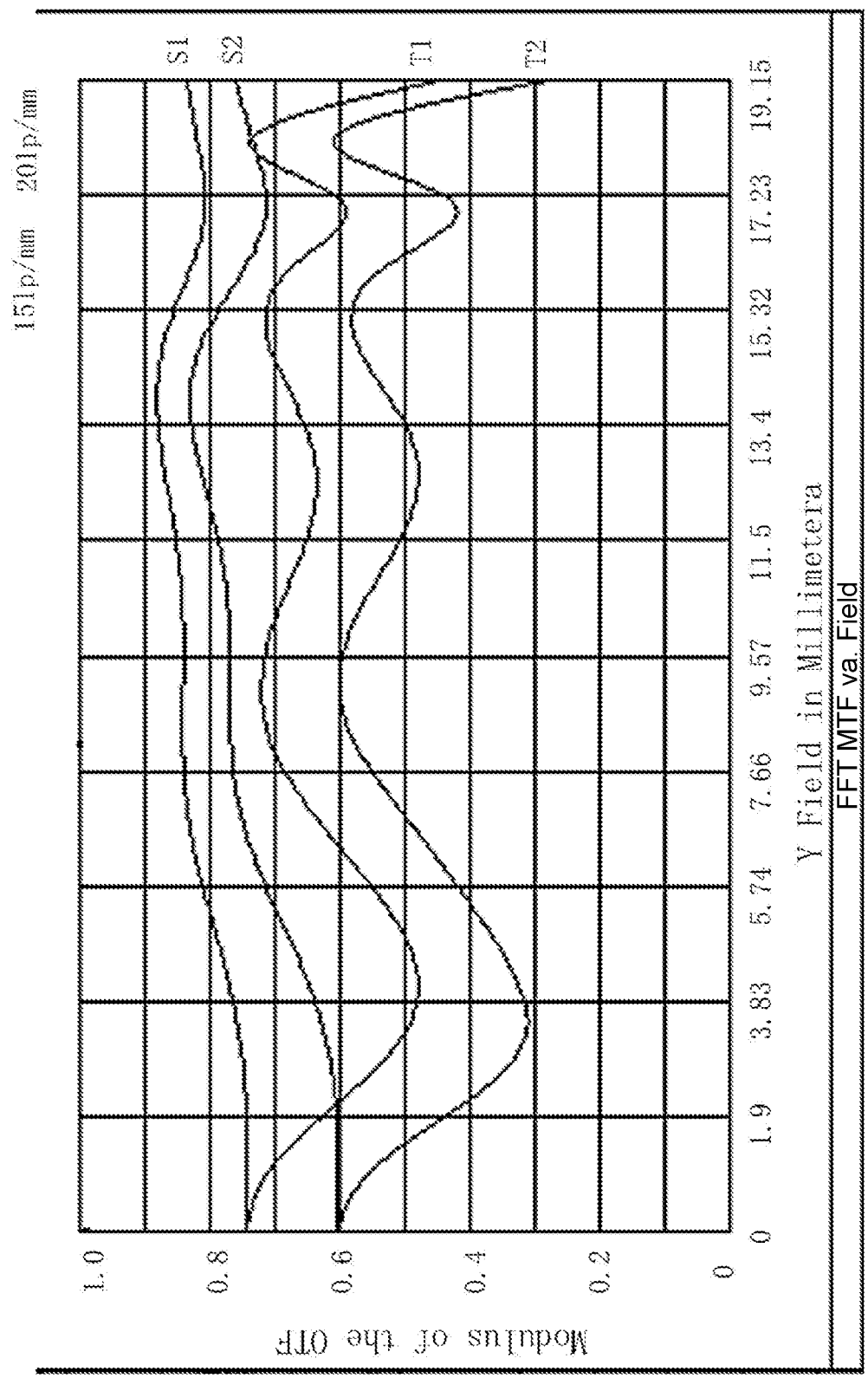
FIG. 6 is an MTF vs. field diagram of a VR equipment provided by an embodiment of the invention when the diopter is 0D.

FIG. 6 is an MTF vs Field diagram of a VR equipment provided by an embodiment of the invention when the diopter is 0D. As shown in FIG. 6, in two different modes of 15 line pairs/mm and 20 line pairs/mm, the distance between the sagittal curve and the meridional curve is closer, the astigmatism of the lens is less, and the curves are smoother, with little fluctuation, and the imaging uniformity is higher, so as to meet the requirements of better image quality.

Figure 7:
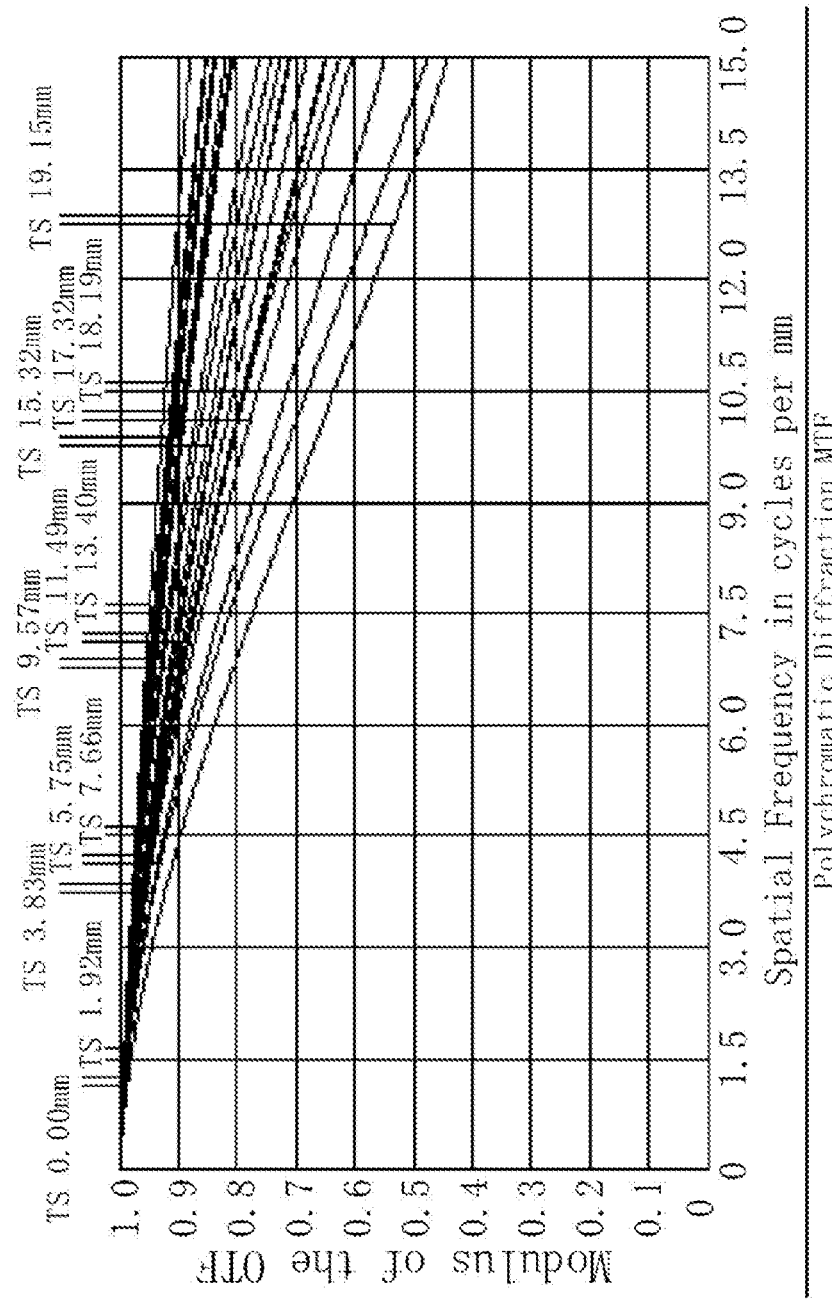
FIG. 7 is an MTF diagram of a VR equipment provided by an embodiment of the invention when the diopter is 0D.

FIG. 7 is an MTF diagram of a VR equipment provided by an embodiment of the invention when the diopter is 0D. As shown in FIG. 7, the transfer function of 15 line pairs/mm in the MTF curve is basically 0.4 or more, which may meet the requirements of better image quality.

Figure 8:
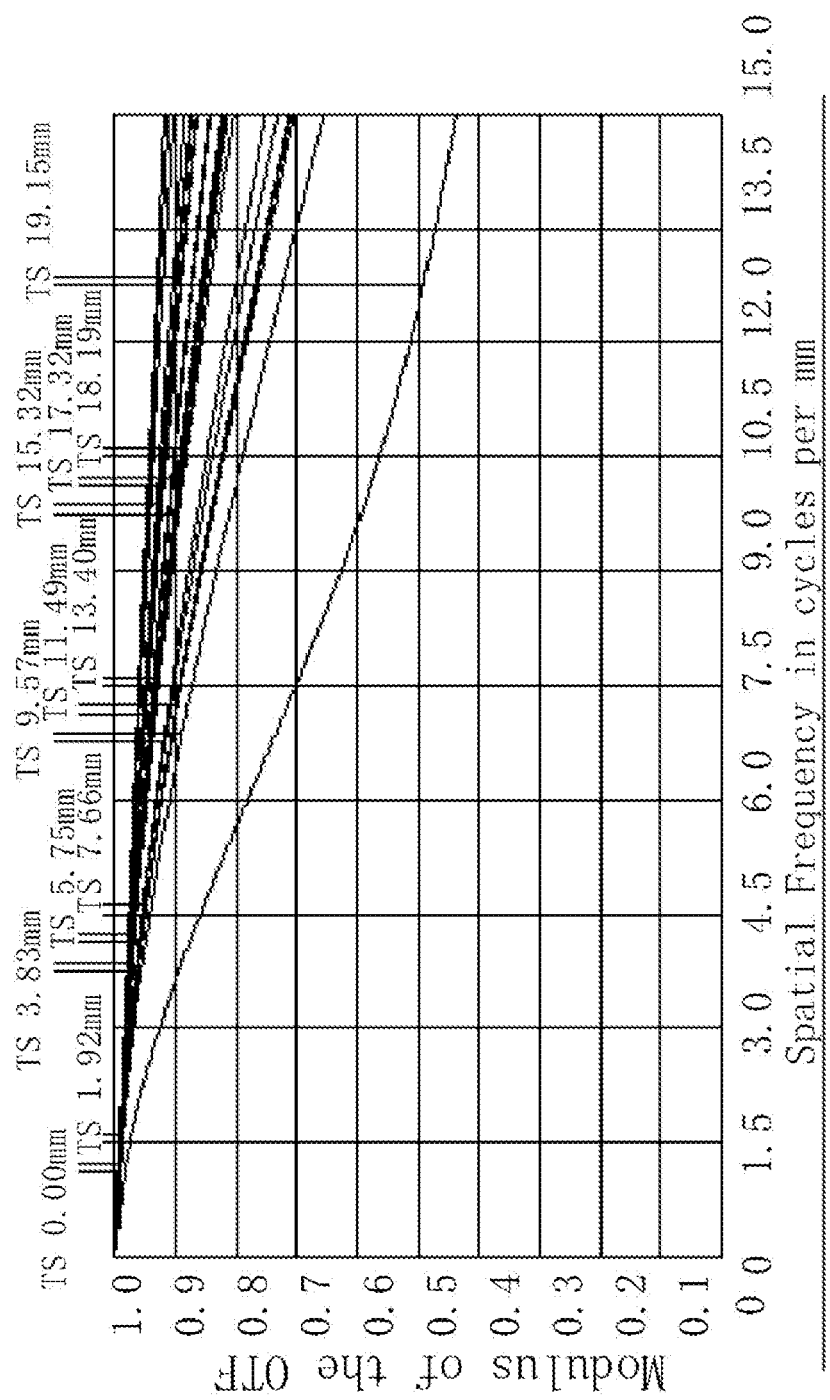
FIG. 8 is an MTF diagram of a VR equipment provided by an embodiment of the invention when the diopter is -3D.

FIG. 8 is an MTF diagram of a VR equipment provided by an embodiment of the invention when the diopter is −3D. As shown in FIG. 8, the transfer function of 15 line pairs/mm in the MTF curve is basically 0.4 or more, which may meet the requirements of better image quality.

Figure 9:
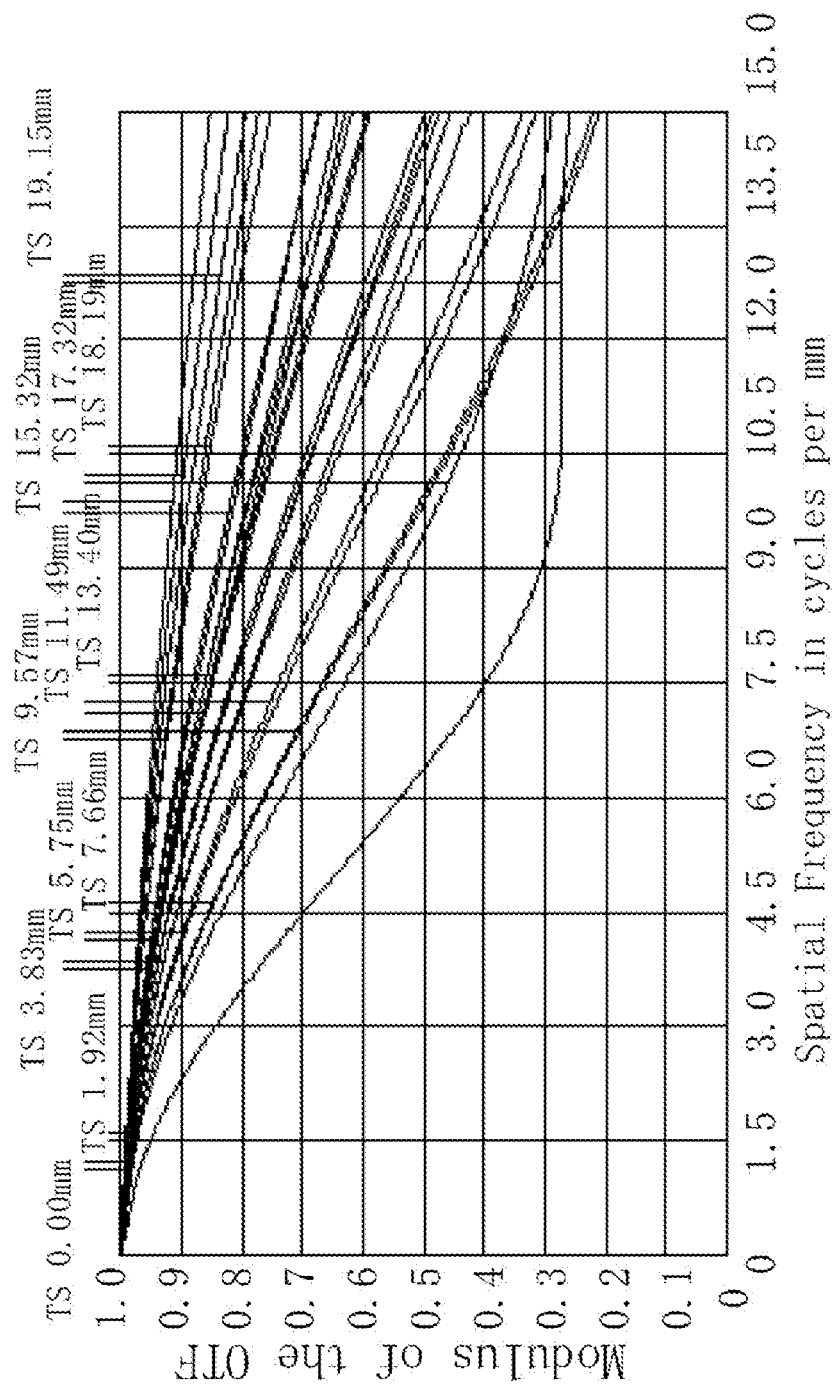
FIG. 9 is an MTF diagram of a VR equipment provided by an embodiment of the invention when the diopter is -6D.

FIG. 9 is an MTF diagram of a VR equipment provided by an embodiment of the invention when the diopter is −6D. As shown in FIG. 9, the transfer function of 15 line pairs/mm in the MTF curve is basically 0.2 or more, which may meet the requirements of better image quality.

The above specific implementation methods do not constitute a limitation to the scope of the invention. It should be apparent to those skilled in the art that various modifications, combinations, sub-combinations, and substitutions may be made depending on design requirements and other factors. Any modifications, equivalent replacements, and improvements made within the spirit and principles of the invention shall be included within the scope of the invention.

What is claimed is:

1. A VR equipment, comprising:
   a casing, and an optical module, an eye movement module, and a display module located inside the casing;
   the optical module comprises a lens barrel and a first lens, a second lens, a third lens, and a fourth lens located in the lens barrel and arranged in sequence from an object plane to an image plane along an optical axis;
   the eye movement module is located between the first lens and the second lens; the eye movement module is provided with a light-emitting unit and a receiving unit, and the light-emitting unit emits a detection light to human eyes and then the detection light is reflected, and after the reflected detection light passes through an object side surface and an image side surface of the first lens, the reflected detection light is reflected at an object side surface of the second lens and then enters the receiving unit;
   the display module is located at an image side surface of the fourth lens, and the display module is configured to display an image.

2. The VR equipment of claim 1, wherein the VR equipment further comprises an adjustment unit, the adjustment unit is movably connected to the casing and connected to the lens barrel, and the adjustment unit is configured to drive the lens barrel to move to adjust a distance between the third lens and the fourth lens.

3. The VR equipment of claim 1, wherein a focal length of the second lens is FL2, and a focal length of the fourth lens is FL4, wherein FL2>0 and FL4<0.

4. The VR equipment of claim 1, wherein a radius of curvature of an object side surface of the second lens is R2, wherein, $157.5 \leq R2 \leq 318.5$.

5. The VR equipment of claim 1, wherein a refractive index of the fourth lens is Nd4, and an Abbe number thereof is Vd4, wherein Nd4>1.6 and Vd4<30.

6. The VR equipment of claim 1, wherein an object side surface of the second lens is provided with an infrared light reflection film and a visible light anti-reflection film, and an image side surface of the fourth lens is provided with a semi-transparent and semi-reflective film.

7. The VR equipment of claim 1, wherein the optical module further comprises an optical polarization conversion film, and the optical polarization conversion film is disposed between the second lens and the third lens.

8. The VR equipment of claim 1, wherein a distance from a center of an optical axis of the object side surface of the first lens to the image plane is TTL, wherein $19 \text{ mm} \leq TTL \leq 32 \text{ mm}$.

9. The VR equipment of claim 1, wherein a focal length of the first lens is FL1, and an effective focal length of the optical module is EFL, wherein $43.5 \text{ mm} \leq FL1 \leq 81.2 \text{ mm}$, $0.37 < EFL/FL1 < 0.41$.

10. The VR equipment of claim 1, wherein a field of view of the optical module is FOV, wherein FOV≥90°.

\* \* \* \* \*